Oct. 6, 1970  P. MAY  3,532,239
DEVICE FOR FORK INCLINATION IN LIFTING TRUCKS
Original Filed Aug. 17, 1966  2 Sheets-Sheet 1
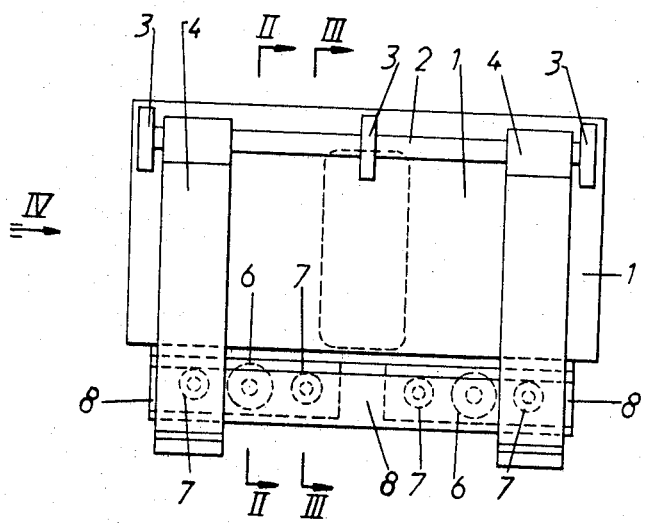
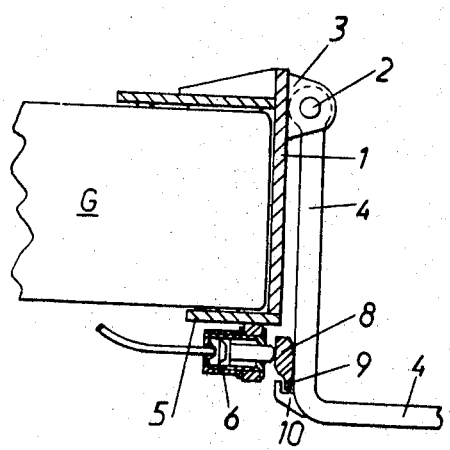
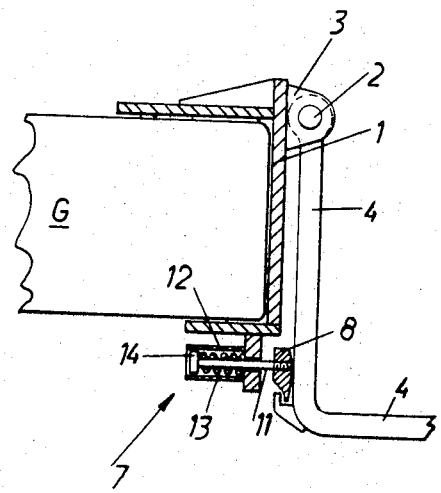
Inventor
Pierluigi May Oct. 6, 1970          P. MAY          3,532,239
DEVICE FOR FORK INCLINATION IN LIFTING TRUCKS
Original Filed Aug. 17, 1966          2 Sheets-Sheet 2
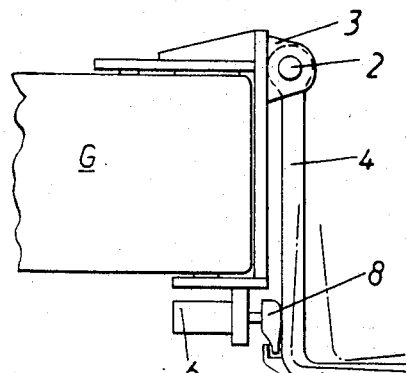
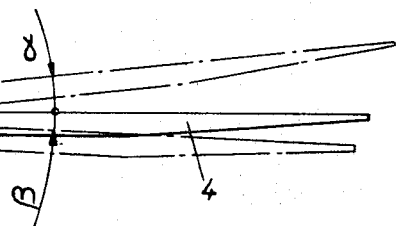
FIG. 4.
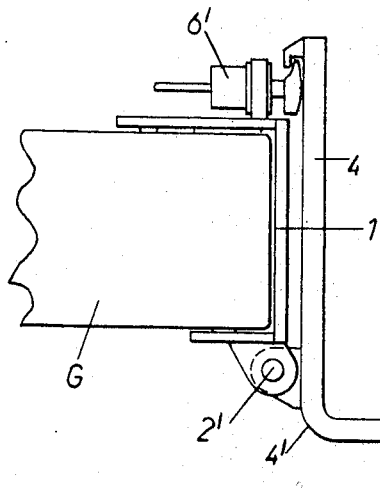
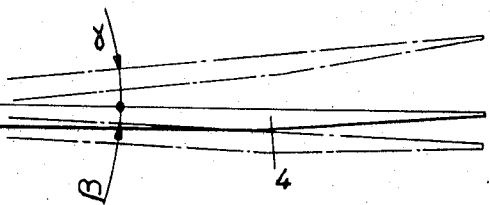
FIG. 5.
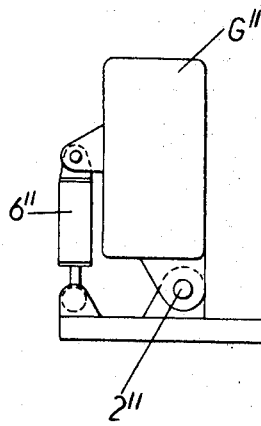
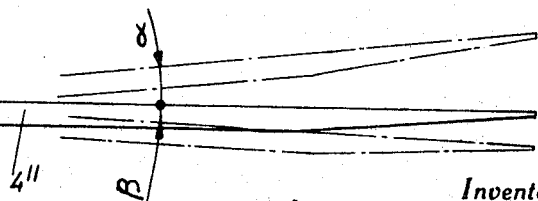
FIG. 6.
Inventor
Pierluigi May
By Stevens, Davis, Miller & Mosher
Attorneys United States Patent Office 3,532,239
Patented Oct. 6, 1970

3,532,239
DEVICE FOR FORK INCLINATION IN
LIFTING TRUCKS
Pierluigi May, Via Pompeo Leoni 18, Milan, Italy
Continuation of abandoned application Ser. No. 572,958,
Aug. 17, 1966. This application Apr. 7, 1969, Ser. No.
814,210
Claims priority, application Italy, Aug. 18, 1965,
8,170/65
Int. Cl. B66f 9/16
U.S. Cl. 214—701                                  3 Claims

ABSTRACT OF THE DISCLOSURE

In a lift truck vehicle the improvement comprising a fork carrying plate fixed to the lifting unit of the vehicle and carrying a horizontal shaft. At least one fork is rockingly mounted on the shaft and reciprocating means are provided to reciprocate the fork by engaging a support plate which in turn carries the fork.

This application is a continuation of application Ser. No. 572,958, filed Aug. 17, 1966.

It is known that the loading forks in lifting trucks have to be capable of being upwardly and downwardly inclined, respectively, in order to hold the transported load while running and to readily draw and unload the same. At the present state of the art these fork inclinations are obtained by rotating the whole lifting unit of the truck, on which the fork carrier plate is disposed, in either direction about a horizontal axis. For this purpose, the lifting unit is pivoted on the front bridge or on the frame of the truck, and its inclination is controlled and adjusted by one or more hydraulic cylinders, or by other devices suitable for obtaining the same result.

There are cases however in which the inclination of the whole lifting unit will not be suitable for a rational utilization of the truck. A typical example is to be found in the case of a truck provided with forks rotatable about a vertical axis. When the forks are at the side location, that is normal to the plane of symmetry of the truck, or at any other location different from the front forking location, lifting unit inclination could cause a sliding of the load instead of holding it still against the fork shoulders. Therefore a necessity arises for providing a device allowing the forks to incline independently of the lifting unit which can therefore be held stationary.

The object of the invention is a device of the above type and the invention is characterized in that the forks are rockingly mounted about a horizontal axis relative to the lifting unit of the truck, means being provided for controlling the oscillation of said forks within a predetermined amplitude range and for locking the same at any desired location of said range, independently of the position of the lifting unit.

The invention will now be illustrated by way of example with reference to the appended drawings showing some preferred embodiments of the invention, and in which:

FIG. 1 is a front view of the lifting unit for a lifting truck outfitted with the device according to the invention;

FIG. 2 is a sectional view taken along line II—II of FIG. 1;

FIG. 3 is a sectional view taken along line III—III of FIG. 1;

FIG. 4 is a side view, in the direction of arrow IV of FIG. 1, of the lifting unit for the truck with the device of FIGS. 1–3, showing the operation thereof;

FIG. 5 is a view like that of FIG. 4 relative to a first variant of the device according to the invention; and FIG. 6 is a view like that of FIGS. 4 and 5, showing a second variant of the device according to the invention.

In the embodiment of the invention shown in FIGS. 1–4, the fork carrier plate or frame 1, mounted on element G slidably mounted on the uprights of the lifting unit for the lifting truck, carries at the top thereof a fixed shaft 2 supported by three brackets 3. Two square forks 4 are pivoted on shaft 2 with the ends thereof free of transverse slidings. At the lower part 5 of the fork carrier 1 two single acting hydraulic cylinders 6 and four spring return elements 7 are secured. As seen from FIG. 2, the piston of cylinder 6 terminates against a support bar or crosspiece 8, the lower edge 9 of which is in engagement with a hook 10 of fork 4 bearing on bar 8. Spring element 7 in turn comprises (FIG. 3) a rod 11 guided within a cylinder 12 which accommodates a helical cylindrical spring 13 bearing on the end disc 11 of said rod. Rod 14 operates on said bar 8 on and to which the fork heels bear and are hooked.

Operation of the device is quite simple: by admitting the drive fluid into cylinder 6, raising of forks 4 is caused due to oscillation thereof on axis 2. There is thus obtained, as shown in FIG. 4, a movement of the forks from the horizontal position to the upward inclined position through an angle α, allowing an effective restraint of the load, particularly during movement of the vehicle. As easily understood, an oppositely inclined position of the forks through an angle β, also exemplarily shown in FIG. 4, is convenient for unloading and loading operations. For this purpose, cylinder 6 is discharge so that springs 13 and the eventual load on the forks will first return said forks to the horizontal position, and then to a position past the horizontal one, in the desired way. It is to be understood that a shrewd operation of the feed and discharge of cylinder 6 will allow forks 4 to assume any one of an infinity of positions within the predetermined inclination range.

It is evident that the device just shown and described can be fitted for numerous modifications or involve important variants. By mere way of example, the variant of FIG. 5 contemplates an opposite position of the pivot axis and control means. At the bend 4' thereof, forks 4 are pivoted on a shaft 2' at the bottom secured to fork carrier 1 and are controlled by cylinders 6' and spring means mounted at the top of the fork carrier. In this case, operation is completely similar to that of the previous embodiment except that, for obtaining the different inclinations, the controls are operated in the opposite direction. In this case, in replacement of the association of single acting cylinders with spring return elements shown in FIGS. 1–4, double acting cylinders adapted to positively control the position for the forks are therefore particularly fitted.

The variant shown in FIG. 6 contemplates the use of forks 4" turned into simple rectilinear elements hinged to a lower shaft 2" of an element G" movable on the lifting unit of the truck and extending beyond the pivoting point thereof. Double acting cylinders 6" are, vertically mounted at the rear of element G", for adjusting the inclination of forks 4.

Although not shown, the control means for the fork inclination could be mechanical instead of hydraulic. For example, they could be in the form of suitable tie rod or lever systems controlled in any desired way. In lieu of being pivoted on a shaft, as shown in the drawings, the forks could be pivoted on hinge elements or the like, while it is apparent that instead of the forks only, the fork or frame carrier may be inclined always with respect to the lifting unit and independently thereof, with the advantage in this case of replacing the type of forks, if desired.

What is claimed is:
1. A lift truck vehicle having a lifting unit and comprising
   a mounting element capable of vertical movement on said lifting unit;
   a vertically extending fork carrying plate secured to said mounting element;
   a horizontal shaft fixedly attached to the upper portion of said fork carrying plate;
   at least one angular type fork having its upper end rockingly and slidably mounted directly on said shaft;
   a single support plate positively engaging each fork near to the angle thereof and slidable with respect thereto; and
   reciprocating means rigidly secured to the lower portion of said fork carrying plate mounting and engaging said support plate, said reciprocating means serving to control the rotation of each fork about said shaft within a predetermined amplitude range by reciprocating the support plate relative to the carrying plate.

2. The invention of claim 1, wherein said reciprocating means comprises at least one single-acting hydraulic cylinder and spring means acting in opposition to the hydraulic cylinder, said cylinder operation in a horizontal direction.

3. The vehicle of claim 2, wherein two forks and two hydraulic cylinders are provided, each hydraulic cylinder has a piston adapted to push said support plate away from said fork carrying plate, and said spring means act on said support plate and said fork carrying plate to draw said support plate toward said fork carrying plate.

References Cited

UNITED STATES PATENTS

| | | | |
|---|---|---|---|
| 1,875,103 | 8/1932 | Mosel | 214—701 |
| 2,608,315 | 8/1952 | Turner | 214—731 |
| 2,679,330 | 5/1954 | Allen | 214—701 |
| 2,738,087 | 3/1956 | Arnot | 214—701 |
| 2,997,193 | 8/1961 | Dunham | 214—660 X |
| 3,075,665 | 1/1963 | Repke | 214—750 X |
| 3,289,872 | 12/1966 | Peratoner et al. | 214—701 |

GERALD M. FORLENZA, Primary Examiner

R. J. SPAR, Assistant Examiner

U.S. Cl. X.R.

214—660